United States Patent [19]

Judd et al.

[11] Patent Number: 5,430,663
[45] Date of Patent: Jul. 4, 1995

[54] FAULT TOLERANT MULTIPOINT DATA COLLECTION SYSTEM

[75] Inventors: John E. Judd, Hamden; Kenneth E. Appley, Orange; Salvatore J. DeFrancesco, East Haven, all of Conn.

[73] Assignee: Vibrametrics, Inc., Hamden, Conn.

[21] Appl. No.: 989,187

[22] Filed: Dec. 11, 1992

[51] Int. Cl.⁶ .......................................... G01M 19/00
[52] U.S. Cl. ......................... 364/550; 364/551.01; 364/138; 364/140; 340/825.06; 340/825.07; 340/310.01
[58] Field of Search ............... 364/550, 551.01, 551.02, 364/474.11, 138, 140, 132; 340/310 R, 310 A, 825.06, 825.07, 825.08, 825.31

[56] References Cited

U.S. PATENT DOCUMENTS

| | | | |
|---|---|---|---|
| 3,783,680 | 1/1974 | Mason | 73/71.2 |
| 4,153,945 | 5/1979 | Actor et al. | 364/900 |
| 4,155,075 | 5/1979 | Weckenmann et al. | 340/167 |
| 4,415,896 | 11/1983 | Allgood | 324/127 |
| 4,426,697 | 1/1984 | Petersen et al. | 340/825.07 |
| 4,466,288 | 8/1984 | Grynberg et al. | 73/654 |
| 4,530,045 | 7/1985 | Petroff | 364/138 |
| 4,611,491 | 9/1986 | Brown et al. | 73/517 |
| 4,652,821 | 3/1987 | Kreft | 324/208 |
| 4,791,547 | 12/1988 | Petroff | 364/138 |
| 4,905,517 | 3/1990 | Crowe et al. | 73/654 |
| 4,910,658 | 3/1990 | Dudash et al. | 364/138 |
| 4,963,763 | 10/1990 | Minagawa et al. | 340/310 R |
| 4,980,844 | 12/1990 | Demjanenko et al. | 364/550 |
| 5,006,841 | 4/1991 | Vines et al. | 340/825.07 |
| 5,089,974 | 2/1992 | Demeyer et al. | 340/310 R |
| 5,107,256 | 4/1992 | Ueno et al. | 340/825.52 |
| 5,142,277 | 8/1992 | Yarberry et al. | 340/310 R |
| 5,146,401 | 9/1992 | Bansal et al. | 364/138 |
| 5,200,743 | 4/1993 | St. Martin et al. | 340/825.07 |

Primary Examiner—Emanuel T. Voeltz
Assistant Examiner—Hal D. Wachsman
Attorney, Agent, or Firm—DeLio & Peterson

[57] ABSTRACT

A multipoint data collection system uses multiple parallel data buses connecting a central controller to addressable sensor interfaces to permit any sensor to be connected to a central controller over any one of the data buses. Faults on a data bus may be bypassed, or multiple sensors monitored simultaneously in real time, through the use of the parallel data buses. Digital address signals and analog data are transmitted on the same data bus, distinguished from one another by restricting the voltage range of the analog data to voltages above the voltage corresponding to a digital zero and below the voltage corresponding to a digital one.

27 Claims, 6 Drawing Sheets

FAULT TOLERANT MULTIPOINT DATA COLLECTION SYSTEM

BACKGROUND OF THE INVENTION

1. Field of the Invention

This invention relates to systems which collect data from multiple sensors, particularly accelerometers installed at various points around a manufacturing site, and bring the data to a central monitoring location. It is particularly related to systems where the sensors are uniquely addressable over a common data bus.

2. Description of Related Art

Production line and process machinery needs to be monitored for wear to avoid expensive, unexpected breakdowns. This is often done with accelerometers installed on the bearings of motors, pumps and other critical machinery to monitor the vibration of the equipment. Breakdowns are often preceded by changes in the equipment vibration level. These changes can be detected through regular monitoring, allowing the equipment to be repaired during regularly scheduled maintenance periods.

One method of monitoring the sensors is for maintenance personnel to take regular readings of the vibration levels at the sensors by carrying a portable data storage unit directly to each sensor to collect the data. This is time consuming, but effective.

Another method is for the sensors to be individually hardwired to a central station. In this arrangement, a separate wire pair runs from each sensor to the central monitoring station or to a multiplexer which is then connected to the central station. This, design simplifies the data collection task by allowing the data to be collected from the central station mounted in a convenient location.

In the central monitoring station design, other types of sensors, such as tachometers, pressure sensors, temperature sensors and the like may also be added to the system. This allows production process monitoring to be integrated into the vibration monitoring system.

In large systems, however, the numerous sensors makes the cost of running individual wire pairs from the sensors to the central location or multiplexer a major factor in the total cost of the system. Moreover, vibration sensors used to detect abnormal vibrations caused by wear, usually need to be monitored only briefly at widely scattered time intervals. Thus, prior art systems with a single wire pair running to each sensor has far more data transmitting capacity than is required for the majority of applications. A single data bus shared by the sensors is therefore desirable to reduce cabling cost and complexity.

Although the technique of using a common data bus for connecting to digitally addressable electronic elements is known, it has certain difficulties in a factory environment when implemented for monitoring sensors. One is that all the data from all the sensors passes over a single data bus. In the real world, with a network of sensors spread throughout a factory environment, a single data bus is susceptible to damage. An open circuit on the bus will cause the loss of information from all sensors beyond the open circuit and a short circuit makes communication impossible with any sensor on the bus.

Moreover, if the sensors are powered over the cable, the power transmission capabilities of the cable become a factor. Accelerometers are powered through the data bus wires over which the data is transmitted. Reasonably sized data bus wires do not have the power carrying capacity to continuously and simultaneously power the large number of sensors desired for many installations.

A further difficulty in a bus configuration design is that the sensors need to be uniquely identified by an address so that a desired sensor on the bus can be singled out and told to transmit its information. A digital address and digital address circuitry is clearly the most suitable for this task, but commonly available sensors generate analog data. This requires the use of one pair of wires for addressing the sensors and another set for transmitting the analog data. An alternative solution is to convert the analog data to digital form and run an all digital bus, but this requires expensive analog to digital circuitry at each sensor. Neither solution is desirable.

Accordingly, one object of the present invention is to provide a bused data collection system wherein the system includes redundant parallel data buses for fault tolerance in the event that any one bus is damaged.

Another object of the invention is to provide a design in which each sensor is connected to several data buses, and a central controller can electrically switch any sensor onto any selected one of the data buses.

A further object of the invention is to provide a design in which multiple parallel data buses may be simultaneously used to receive data from different sensors to permit real time direct comparison between the output of the sensors.

Still another object of the invention is to provide a design in which digital sensor addressing and analog data transmission occur on a shared data bus, Another object of the invention is to provide a design in which multiple sensors share a single data bus, and that data bus is used bidirectionally to transmit digital address data from the central location to select a specific one of the sensors and to transmit analog sensor data from the sensor to the central location.

Still other objects and advantages of the invention will in part be obvious and will in pad be apparent from the specification.

SUMMARY OF THE INVENTION

The invention achieves fault-tolerant multipoint data collection through the use of a set of redundant parallel two-wire data buses organized into a single cable. A central controller is connected to a plurality of sensors through the cable which connects to a corresponding plurality of addressable sensor interfaces positioned between the cable and the sensor interface. The central controller generates an address signal identifying a selected sensor interface and a selected data bus, and sends that signal through bus interfaces, one for each data bus, connected between the controller and the corresponding data bus.

Each sensor interface is connected to all the data buses in the cable and includes a means responsive to the central controller signal for recognizing its unique address in the signal and connecting its corresponding sensor to a selected one of the data buses specified in the signal.

The address signal is composed of a sensor address portion and a bus address portion. This permits the central controller to specify any sensor and any one of the data buses by transmitting the central controller signal over any one of the data buses.

The invention uses a particularly advantageous method of sharing a single data bus for digital address signals, sensor power and analog data from the sensor. This eliminates the need for a separate digital address bus. In the simplest form of the invention, a single data bus is shared for digital and analog data, but in the preferred design, the benefits of the shared bus are multiplied through the use of multiple parallel buses which provide redundancy for fault-tolerant operation. The central controller supplies power to the sensors from a sensor power supply means through the selected data bus. The sensor power means provides power to the sensor, and the sensor uses that power to generate analog data within a carefully controlled and restricted voltage range having a preset upper and lower voltage limit.

The controller signal used to select the data bus and the desired sensor is a digital signal, generated by a bus interface, having an on voltage greater than the maximum sensor power voltage and an off voltage which is less than the minimum voltage. This places the controller signal completely outside of the voltage range available for data and permits the sensor interfaces to discriminate between the two on the basis of this difference.

In the preferred design, the central controller encodes the sensor and bus address using a self-clocking format in which each data bit of the address is delivered asynchronously and is preceded by a clock bit. This makes the system insensitive to random propagation delays incurred through long cable lengths connecting distant sensors to the controller.

The sensor interface includes a circuit means for disconnecting the sensor from the selected data bus whenever sensor power is removed from the data bus.

DESCRIPTION OF THE PREFERRED EMBODIMENT

Figure 1:
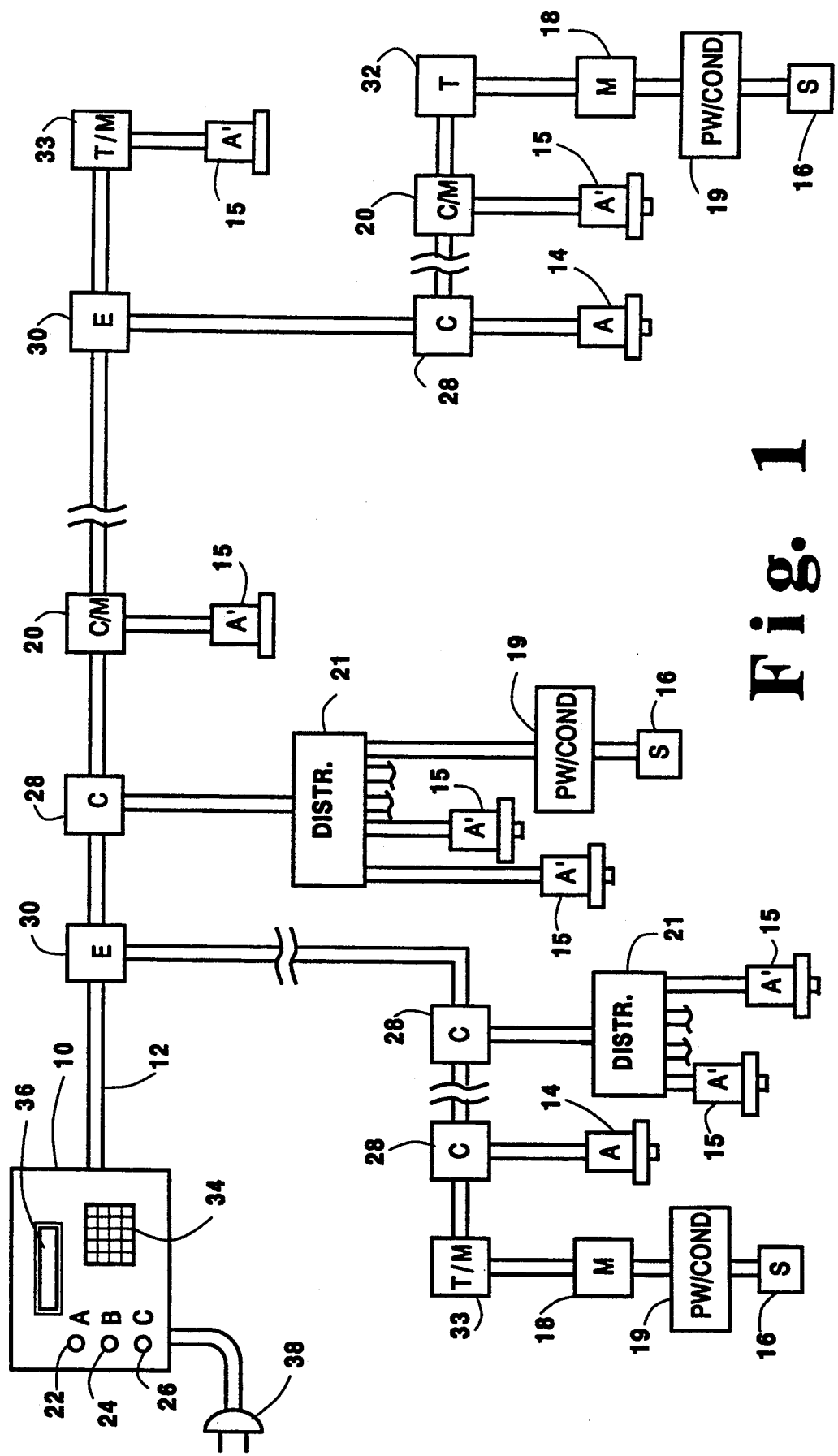
FIG. 1 illustrates the bus layout of the monitoring system.

Referring to FIG. 1, the invention comprises a central controller 10 connected via a cable 12 to multiple specialized accelerometers 14 (marked A), generic accelerometers 15 (marked A') and generic sensors 16 (marked S). The central controller would normally be installed in a convenient location where data from the sensors may be collected. It accepts input specifying a sensor to be monitored, signals the sensor to connect to a data bus within cable 12, provides power to the sensors and associated address circuitry over the cable and provides the data at an output.

The sensors 14, 15 and 16 are connected to the buses within cable 12 through sensor interfaces, described in connection with FIG. 4. The sensors are typically scattered throughout a manufacturing facility mounted at various critical monitoring points. By way of example, accelerometers are often mounted in vibrational contact with the bearings of rotating machinery.

Each sensor has its own sensor interface which stores a unique address, permitting the central controller to specify particular sensors via the address of the corresponding sensor interface. In specialized sensor type 14, which in the preferred design includes some or all of the accelerometers, the sensor interface is located within the case housing the sensor. This provides a convenient one piece assembly, particularly for accelerometers which comprise the majority of the sensors in many installations.

The generic sensors 16 can be any one of a wide variety of off-the-shelf sensors which are available to measure pressure, temperature, speed, strain, flow rate, or any other desired physical parameter. Such sensors do not have the desired integral sensor interface, so it is provided separately. Generic accelerometers 15, which also lack the sensor interface may also be used with the system with the advantage that existing vibration monitoring systems may be upgraded without the necessity of replacing all the accelerometers.

For sensors without the integral sensor interface, the interface may be located at any one of a number of suitable locations as shown in FIG. 1. One such location is within a module 18 (marked M) dedicated to the sensor interface function. A power and signal conditioner 19 (marked PW/COND) is also shown positioned between the sensor and the interface module. Its function is to provide any specialized power that the sensor 16 may need and to convert the sensor's output signal to a form compatible with the monitoring system. The operation of power and signal conditioner 19 depends upon the individual requirements of the particular sensor attached to it, so it is not described in detail, but it produces an analog output signal similar within the same voltage range as the accelerometer output signal described below.

Accelerometer types 14 and 15, and many generic sensors can be supplied with power over cable 12 from power sources within, or connected to, the central controller 10. However, some specialized sensors are powered more conveniently from power sources within the power conditioners 19 which may need separate connection to external power sources.

Other suitable locations for the module containing the sensor interface are within the connector 20 (marked C/M) making connection to the cable 12, within a terminator connector 33 (marked T/M) or within a multiple sensor distribution box 21 (marked DISTR.). The multiple sensor distribution box is connected to the cable 12 with a single connector 28, but contains several sensor interfaces, each with its own unique address, and each corresponding to one of multiple sensors connected to it.

Regardless of where the sensor interface is installed, the sensor is ultimately connected to the cable 12 through the sensor interface via a connector which may take the form of a standard connector 28 (marked C), a connector with integral sensor interface 20 (marked C/M), a terminator 32 (marked T) or a terminator with integral sensor interface 33 (marked T/M).

The connector makes connection to wire pairs within the cable 12 which act as multiple parallel buses to carry power and data to and from the sensors. The preferred design for the system uses a cable 12 with an internal ribbon cable folded within a round outer sheath. The sheath may be opened at perforated junctions spaced along its length to expose the ribbon cable which is then unfolded to a normally flat shape.

Connection to the flattened ribbon cable is made with standard insulation displacement connectors (IDC), the socket portion of which is attached to the flattened ribbon cable and the plug portion of which is attached to the sensor interface. This arrangement permits the sensors to be quickly attached to the cable at any location along its length and repositioned or replaced as necessary.

The IDC connectors make contact with the wire pairs in cable 12, without interrupting them. Any connector capable of making such a connection to the wires in the cable, and any cable configuration containing multiple accessible wires would also be suitable. The connectors 28 may be provided with impedance matching circuitry, if necessary, in accordance with conventional bus design techniques.

Extension connectors 30 (marked E) provide a means of branching the cable 12. They are similar to the connectors 28 in that they are also IDC-based connections, but they connect a branch of the cable 12, containing multiple additional sensors along its length, instead of a single sensor. Terminator connectors 32 (marked T) are similar, but include a standard resistive termination network to prevent ringing on the bus.

In the preferred design shown, the ribbon cable inside cable 12 includes three parallel wire pairs referenced externally as data buses A, B and C. Those familiar with the art will recognize that more than three or as few as one data bus may be used to increase or decrease the fault tolerance of the data collection system. Even a single data bus design has advantages over direct wired prior art data collection systems by virtue of the fewer wires it employs.

Figure 2:
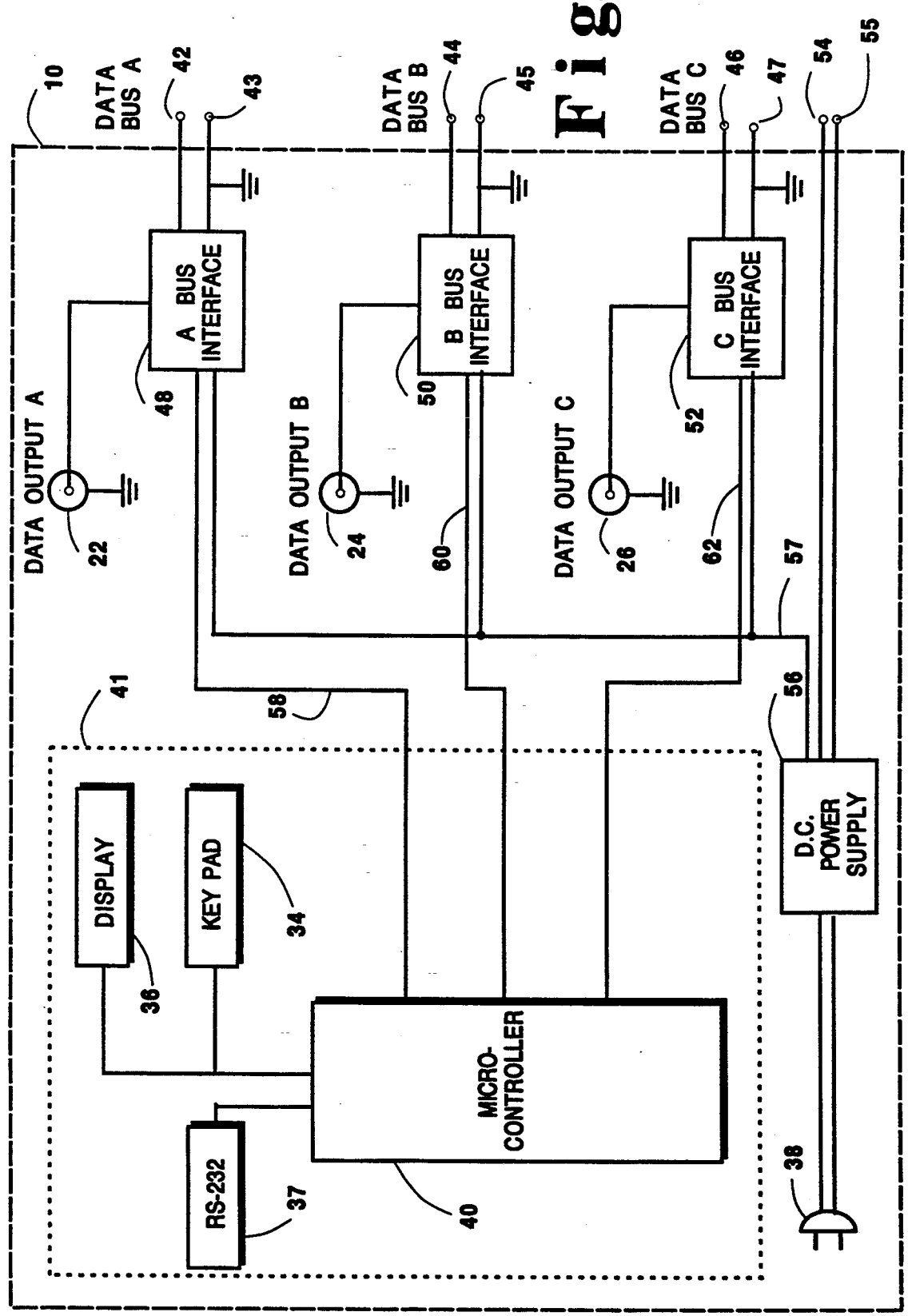
FIG. 2 is a circuit diagram in block diagram form showing the central controller.

Referring to FIG. 2, the data bus wire pair for data bus A includes a signal wire 42 and a corresponding ground wire 43. The data bus wire pairs for data buses B and C include signal wires 44 and 46 and ground wires 45 and 47. As described below the data buses A, B and C are referenced by the controller 10 digitally in a bus address portion of an address signal.

The data buses A, B and C are connected to data outputs 22, 24 and 26 on the central controller 10 through corresponding bus interfaces 48, 50 and 52 (see FIG. 2). These outputs are provided so that a portable data storage unit may be connected to any one of them to receive data from a selected sensor over the corresponding data bus.

In the preferred design, the cable 12 also includes at least one, and preferably two, additional wire pairs arranged as keep-alive power buses, to power the sensor interfaces. They supply power to operate the digital address circuitry in the sensor interfaces so that they can recognize their address when selected and connect their sensor to the data bus. The sensor itself is not powered over the keep-alive power bus, but, instead, is powered over the selected data bus.

The address circuitry in each sensor interface simultaneously monitors all of the data buses. The central controller 10 specifies an interface and a data bus via an address signal containing the address of the desired interface and the bus to be used. This signal is sent to a bus interface where it is formatted and placed on a data bus. Each sensor interface receives the signal, and the sensor interface whose internally stored address matches the address in the signal connects its sensor to the data bus specified in the bus portion of the address signal so that data transmission can begin.

The address circuitry requires very little power compared to the sensor, and a large number of sensor interfaces may be simultaneously powered on the keep-alive bus. The second keep-alive power bus may be used as a spare, or, where the number of sensors is so large that the power transmission capability of one keep-alive power bus is exceeded, the sensors may be split between the two buses.

The controller is powered via a standard AC power connection 38 and includes an input means 34, used to fell the controller what sensor is to be activated and which data bus should be used to send the data from that sensor. For manual operation, the input may be a keypad 34, as shown in FIG. 1 or a keyboard. These allow a sensor address to be entered manually as well as the desired bus.

Alternatively, the system may be set up for more automated operation under the external control of a computer or an automated data storage unit in which case an RS-232 serial interface or a direct connection to a computer bus may be used as the input. These inputs may be used instead of, or in addition to, a keypad or keyboard. In each case, the principal function of the input means is to specify the address of a sensor to be powered up for data collection and a bus over which the data is to be transmitted.

The central controller also includes an output means for signaling the status of the controller. This may take the form of an LCD display 36, as shown in FIG. 1. It may also include an RS-232 serial interface, a computer monitor, a connection to a computer bus or any combination thereof. The output is used to supply information either directly to a user of the system or to an automated data collector. The information may include such items as the address of the currently selected sensor, which of the data buses are in use, whether data is arriving on the buses and whether the data is good and is not being distorted through clipping.

Referring to FIG. 2, a microcontroller 40 performs the job of managing system operation and translating between the input and output means 34, 36 on the one hand and the data collection system on the other. It performs such functions as accepting data from the keypad when keys have been pressed, interpreting the input specifying the sensor and bus, preparing a digital address signal, turning on certain trigger signals to activate portions of the bus interface, monitoring to see if arriving data is good, sending status information out the output and other timing and sequencing functions to coordinate the system operation.

An optional digital input/output means such as the RS-232 connection 37 may be used instead of or in addition to the input/output means 34, 36 to permit automated control of the system from a computer or portable data logger.

As those familiar with conventional microcontroller circuits will recognize, the microcontroller will also include additional support chips (not shown), such as buffers, a programmable read only memory (PROM) to store an input/output program which controls the microcontroller operation, and a random access memory (RAM) which may be part of the microcontroller chip or separate. All of these support chips would be contained within the control section 41 of the central controller 10, and the design of the microcontroller based control section 41 is entirely conventional.

The data from the specified sensor arrives at the central controller over one of the specified two-wire data buses 42-43, 44-45 and 46-47, and is made externally available for recording by a data logger or other device at data outputs 22, 24 and 26. The data buses are connected to the central controller through three substantially identical bus interfaces 48, 50 and 52.

The microcontroller 40 controls operation of the bus interfaces over control buses 58, 60 and 62. The control buses include multiple control and status lines, described fully in connection with FIG. 3, for sending and receiving digital signals to and from the bus interfaces.

In addition to the six wires of the three data buses, the cable 12 includes two wires of the keep-alive power bus 54, 55 driven by the DC power supply 56. The DC power supply also powers the microcontroller 40, the bus interfaces 48, 50, 52 and through them, the sensors over the data buses. Additional two-wire data buses and/or keep-alive power buses may be incorporated into the cable 12 to provide additional data and/or power pathways.

The DC power supply 56 generates at least three distinct voltages to power different portions of the circuitry, +KPV, +SPV and +DPV. Power line 57 is shown to emphasize the fact that power is sent to the bus interfaces and from there to the sensors over cable 12. Other parts of the central controller are also powered in a conventional fashion although the power connections are not shown.

The highest voltage supplied by DC power supply 56 is the keep-alive power voltage (+KPV). This is the voltage supplied to the address circuitry over the keep-alive bus 54-55. As described below, this voltage is also used as the binary "on" voltage in the digital address signal sent over the data buses. The off voltage is essentially zero volts.

The second, and next lower voltage is sensor power voltage (+SPV). This voltage is used to supply the constant current sensor power source 86. The sensors set up a bias voltage that is less than SPV on the data buses, with the AC analog data fluctuating around the bias voltage. The analog data voltage can never exceed +SPV, and this difference is used to prevent analog data from being confused with digital data which is always 0 or +SPV. Restrictions on the minimum voltage level of the analog data makes the voltage ranges for valid digital data and valid analog data mutually exclusive.

The last, and lowest voltage level is digital power voltage (+DPV). This voltage is used to power many of the digital integrated circuits.

Figure 3:
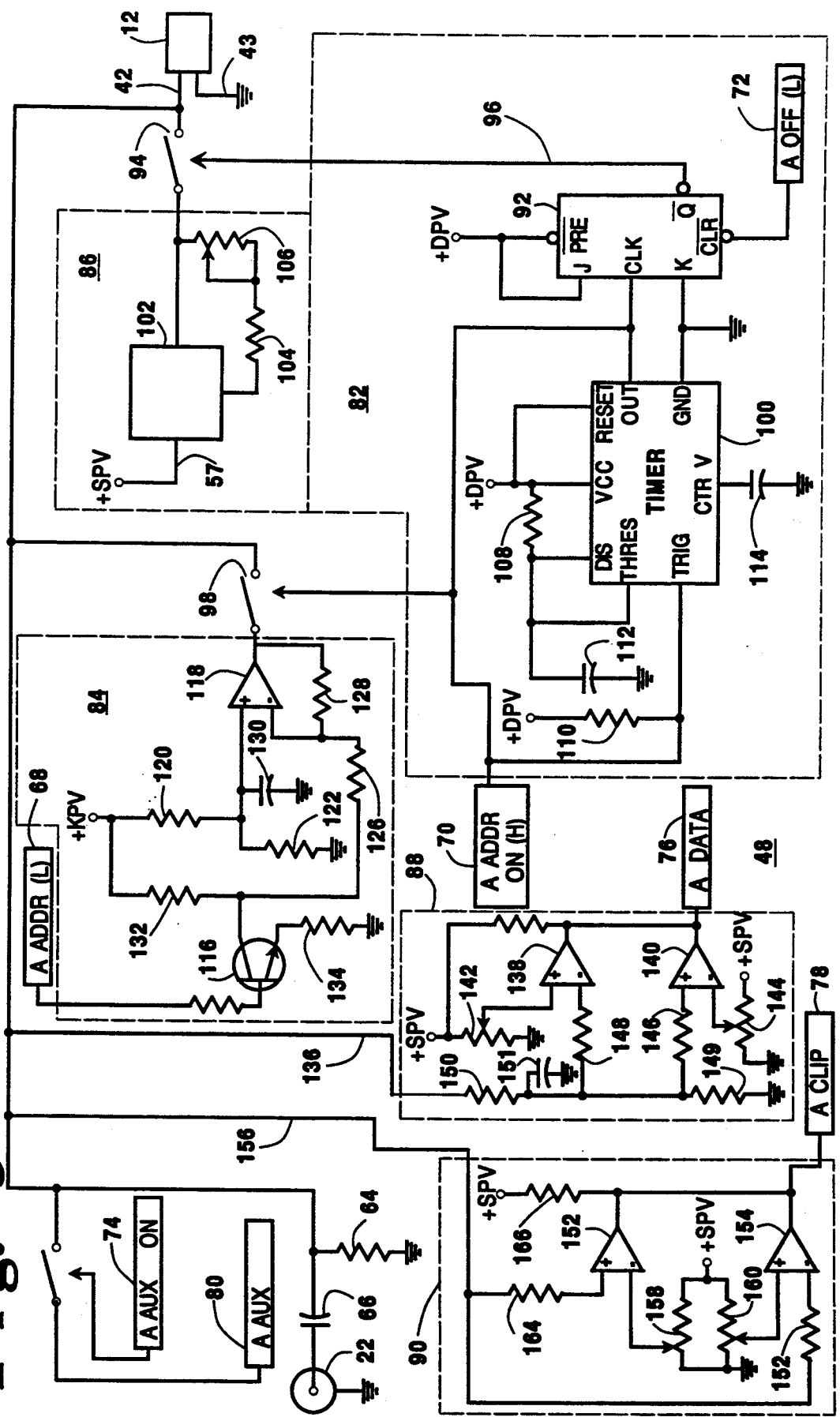
FIG. 3 is a circuit diagram of a bus interface in the central controller as shown in block form in FIG. 2.

Turning now to the bus interfaces, FIG. 3 provides a detailed circuit diagram for bus interface 48 connected to data bus A. As the three bus interfaces 48, 50 and 52 are identical, only bus interface 48 will be fully described.

Digital control signals from the microcontroller 40 are sent to the bus interface 48 over various control lines marked "A ADDR" 68, "A ADDR ON" 70, "A OFF" 72, and "A AUX ON" 74. Digital status signals from the bus interface are sent to the microcontroller 40 over status lines marked "A DATA" 76 and "A CLIP" 78. The line marked "A AUX" 80 is an auxiliary DC connection to the sensors over the data bus 42. It may be used to supply power over the data bus to any sensor that may require non-standard power, or it may be used for DC data output.

Generally, however, AC data output is provided at data output 22 from data bus. 42 through a conventional AC output network composed of resistor 64 and capacitor 66. They transmit the AC data signal and block the DC bias on the data bus during the interval when data is being transmitted.

The control and status lines referred to herein are part of the control bus 58 on FIG. 2, and the labeled control and status lines 68-80 in FIG. 3 terminate at addressable inputs and outputs of the microcontroller 40. The microcontroller 40 also includes corresponding control and status lines for the other two bus interfaces 50 and 52 within the control buses 60, 62.

The bus interface 48 performs the following essential functions:

1. It receives a digital address signal from the microcontroller 40 specifying a sensor address and a data bus, formats the address signal by shifting its voltage from conventional zero to five volt TTL voltage levels to zero to +KPV levels to enable the sensor interfaces to recognize it as a digital address, and then transmits the signal over the data bus 42-43.
2. It times a delay period during which the address signal is sent, then applies a constant current power to the data bus 42 in order to set up the bias voltage and power the selected accelerometer sensor.
3. As data begins to arrive on the data bus 42, the bus interface 48 monitors and tests that data and signals the microcontroller a) that data is now arriving and b) that the data is within the operating range.
4. At a subsequent point in time, upon command from the microcontroller, the bus interface disconnects power from the data bus 42 which resets all the sensor interfaces to a standby mode in which they await a new address signal.

These functions are principally performed by a timer circuit 82, an address circuit 84, a sensor power supply 86 and two (2) data monitoring circuits 88 and 90.

The first step in a data collection cycle is for the microcontroller 40 to insure that the sensor power is turned off on the data line 42 by switching the A OFF line 72 low. This clears flip-flop 92 and opens FET electronic switch 94 which is connected to the flip-flop 92 over line 96. Clearing the flip-flop output opens switch 94 and disconnects the sensor power supply 86 address bus 42.

When the sensor power is removed from data bus A, any previously selected sensor that is connected to and drawing sensor power from that data bus will disconnect, reset and switch to the standby state.

Next, with the data bus clear, the microcontroller 40 signals the bus interface that an address is to be sent over data bus A by turning the A ADDR ON line 70 high.

Turning line 70 high closes FET switch 98, connecting the address circuit 84 to the data bus 42 and simultaneously starts the timing cycle of timer circuit 82.

Timer circuit 82 will then begin to count out a preset timer period via a 555 timer 100, as set by the RC time constant of resistor 108 and capacitor 112. At the end of the preset time period, the output of timer 100 will flip the state of J-K flip-flop 92, closing switch 94 and supplying sensor power from the sensor power circuit 86 to the data bus 42.

Within the preset time period generated by timer 100, the microcontroller 40 needs to generate an address signal specifying the desired sensor, and send that signal to the bus interface so that the appropriate sensor can be connected to data bus 42 to receive the power. In the preferred design, timer 100 generates a delay of at least 100 milliseconds after the A ADDR ON line 70 goes high before it switches the state of J-K flip-flop 92.

Once the A ADDR ON line 70 is turned high, the address signal is sent from the microcontroller 40 to the address circuit 84 over control line 68. The address signal generated by the microcontroller includes two portions. The first portion is the address of the sensor interface connected to the sensor from which data is to be collected.

The second portion identifies the bus over which the data is to be sent. The A bus interface 48 will be used to signal to a sensor that data should be transmitted over the A data bus 42-43, the B bus interface 50 will be used to signal to a sensor that data should be transmitted over the B data bus, etc.

The address circuit 84 is basically a voltage level shifter, converting the address signal generated by the microcontroller 40 from its original zero (off) to five volt (on) levels to a zero (off) to +KPV (on) digital address signal before it is sent on to the data bus 42.

When timer 100 times out, it opens switch 98 and flips the state of flip-flop 92 closing switch 94 thereby disconnecting the address circuit 84 from the data bus and connecting instead sensor power supply 86.

Sensor power supply circuit 86 includes a three terminal power regulator 102 configured as a constant current source by resistors 104 and 106. Because the power supply is powered with a maximum voltage of +SPV which is less than +KPV, the analog sensor data voltage cannot exceed +SPV and cannot be confused with digital address signals which are either off or +KPV in magnitude.

Bias/impedance converter circuitry at the accelerometer (see FIG. 6) sets up a nominal bias voltage of 50% of +SPV from the current supplied by the sensor power circuit 86. This circuitry also limits the minimum voltage of the data from the sensor which prevents the address circuitry on other sensor interfaces from confusing data with address signals from the microcontroller 40. The absence of bias voltage when the sensor power circuit 86 is disconnected by switch 94 can be uniquely detected in the sensor interface to reset the selected sensor and take it off line.

The constant current source is particularly suited for powering accelerometers. For other types of sensors requiring different forms of power, the A AUX line 80 may be used to supply power, provided that it is limited to the voltage range of minimum data voltage to +SPV as previously described. The connection of the A AUX line is controlled over the A AUX ON line 74 by the microcontroller.

The address circuitry 84 shifts the voltage level of the incoming address bits on A ADDR line 68 so that a digital "on" is +KPV. The address pulses from line 68 switch transistor 116. When the A ADDR line goes high, transistor 116 conducts, the voltage at the collector of transistor 116 shifts low, which drops the voltage at the inverting input of comparator 118 below the voltage set by the biasing resistors on the non-inverting input of 118 causing the output of 118 at switch 98 to shift high to approximately the full +KPV voltage.

If the sensor interface, to be described below, is operating properly, the sensor interface corresponding to the address specified in the address signal just transmitted will have connected its sensor to the A data bus and the biasing circuitry thereon will have set up a bias voltage on the A data bus of approximately 50% of +SPV. Analog data ranging between the minimum data voltage and +SPV will begin to appear on data bus A as the sensor operates, and this data passes to data output A through capacitor 66.

To verify that good data is arriving, the voltage on data bus A is monitored by modules 88 and 90. Module 88 monitors the DC bias voltage, and module 90 monitors the AC voltage to verify that the signal is in the valid range and is not being distorted as a result of clipping or saturation.

Module 88 monitors the A data bus signal line over wire 136 through resistor 150, which with capacitor 151 and resistor 149 acts as a low pass filter and essentially shorts the AC component to ground. Comparators 138 and 140 set up a voltage window around the expected bias voltage and signal the central controller 40 by turning the A DATA line 76 high whenever the bias voltage is good. This signals that data is available on the A data bus. Typically, the microcontroller will then turn on an indicator in the display 36 or signal an automatic data collector that data can now be collected.

If the bias voltage goes too high, comparator 138 will switch its output low, turning of the good data signal on A DATA line 76. If the bias voltage goes too low, comparator 140 will switch its output low, turning off the data available signal on A DATA. Either situation will signal the microcontroller that good data is no longer available.

The monitoring circuit 90 operates in a similar manner to the monitoring circuit 88, except that it lacks the low-pass filtering. It includes two comparators, 152 and 154 connected to the data bus 42 over line 156 through resistors 162 and 164. The comparators 152 and 154 set up a much wider comparison window to monitor the AC nature of the data signal than was set up with the DC monitor in module 88. Resistors 158 and 160 are adjustable to set the voltages at which the comparators turns off the signal on A CLIP 78.

If the swings of the AC signal fall outside of the wide voltage window set by comparators 152 and 154, one of the comparators will switch its output low as long as the voltage is outside its window. The A CLIP data line 78 will then go low, signaling the microcontroller 40 that the data is not good.

Figure 4:
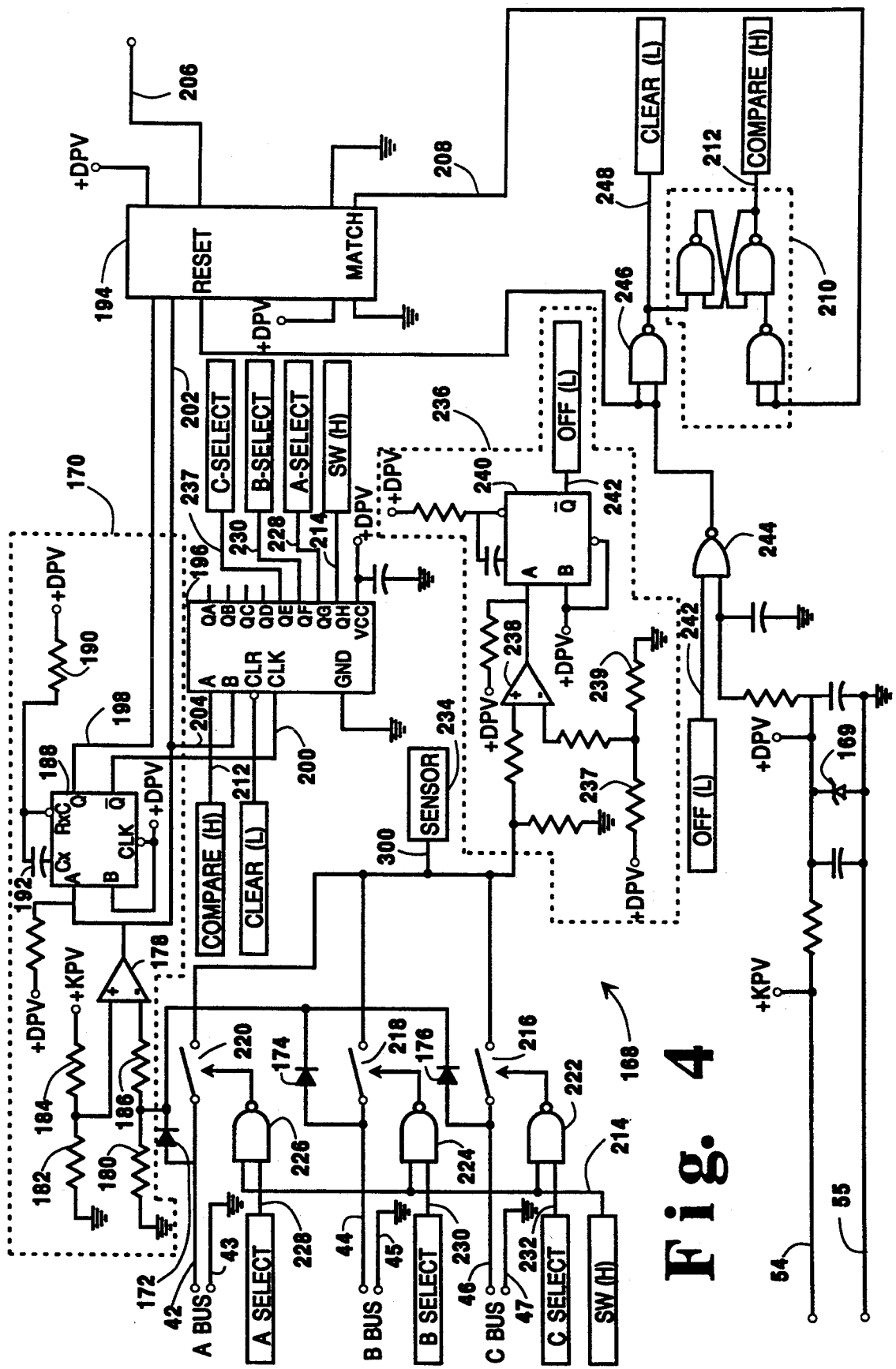
FIG. 4 is a circuit diagram of a sensor interface.

FIG. 4 presents the circuit diagram for a sensor interface 168. The sensor interface 168 may be mounted in the housing for an accelerometer 14, in a separate interface module 18, in a terminator 33, in a bus connector 20 or in a multiple sensor distribution box 21. Each sensor interface is identical except for the unique address stored within it.

Power is supplied to the sensor interface circuitry through the keep-alive power bus 54, 55 carrying +KPV. This voltage is used to generate a reference voltage in the detection of the digital pulses on the data buses. It is also used in a conventional way to produce a lower voltage power, +DPV, for the digital circuitry through zener diode 169 and the associated resistors and filtering capacitors.

Each sensor interface 168 is connected to all three data buses 42-43, 44-45 and 46-47 and to the keep alive power bus 54-55. The data buses are directly connected to an address detector 170 through diodes 172, 174 and 176.

The address detector first performs a voltage level detection with comparator 178 which passes only the +KPV digital address signals as set by the biasing resistors 180, 182, 184 and 186. Voltages at +SPV and below do not pass through comparator 178.

Because the sensors in the system may be located at varying distances from the central controller, delays of varying duration are introduced during propagation of the address signals. To avoid problems due to the unknown length of these delays, each data bit in the address signal is preceded by a clock bit. This "self clocking" is more fully described in connection with FIG. 5 below, however, the clock bit is used to trigger flip-flop 188 to produce a timed output pulse set by resistor 190 and capacitor 192 which strobes in the address bit immediately following the clock bit. This timed output pulse has a trailing edge that falls within the data bit that follows the clock bit.

The resulting output pulse from 188 is fed from the Q output to the address comparator 194 and from the not Q output to the serial to parallel converter 196 over lines 198 and 200, respectively. The address bits which are following the clock bits are also fed to the address comparator 194 and serial to parallel converter 196 over lines 202 and 204. The trailing edge of the timed pulse from 188 causes the address comparator 194 and serial to parallel converter 196 to read the data bits on lines 202, 204. (Actually, as described below, the input gate of serial to parallel converter 196 is only open during the bus address portion of the address signal, so it will only read data bits within this portion.)

Address comparator 194 includes an E2ROM for storing the unique address of this sensor interface. The preferred device for this function is a programmable 16 bit code detector such as an HC2063. The stored "code" is the unique address of the sensor interface, and it can be entered or changed electrically over control bus 206. This is usually done at the time the sensor is installed as the control bus is not connected to the data bus. The control bus typically includes a program line, a clock line, a data line, and lines for reading and modifying the data in the E2ROM.

The address comparator 194 needs an initial "on" bit to begin its compare, so the initial bit of the sensor address field is always one. This bit is labeled "Compare On" in FIG. 5.

Upon receiving an address which matches the stored address, address comparator 194 switches output line 208 high causing the bistable flip-flop 210 to switch the COMPARE (H) line 212 high. COMPARE (H) is a match signal signalling that this sensor has been selected. It is connected to the A input of serial to parallel converter 196. The A and B inputs to converter 196 are the inputs to an AND gate, so until the COMPARE (H) line 212 switches high, the address bits arriving at the B input on line 204 are blocked.

The COMPARE (H) line switches high after the arrival of the first 8 bits (specifying the matching sensor address)in the 16 bit address signal. The remaining address bits (which specify the data bus to be used) are then passed into the serial to parallel converter.

A complete address signal, shown in FIG. 5a, includes a sensor address field and a bus select field. In a single data bus design, the bus select field may be eliminated. Each field comprises eight data bits, each data bit being preceded by a clock bit. The clock bit has a duration which is half the duration of the data bit. It triggers the address detector 170 to generate a pulse (see FIG. 5b), the trailing edge of which falls within the middle of the immediately following data bit. This bit by bit self clocking avoids any problems in timing due to long cable lengths.

The first data bit of the sensor address field is labeled "Compare On", and the first bit of the bus select address is labeled "SW (H)". These first bits of each field are always on, i.e. a digital one. Setting the first bit of each field on simplifies the address circuitry. The remaining seven bits in each field are the sensor address or the data bus address. In the preferred embodiment, only the first three bits of the seven bits available for the bus address, are used. The bits are set in a one-to-one correspondence with the three data buses. The seven bits of the sensor address are a conventional binary number.

Compare On which is Bit 0 of the eight bit sensor address field occurs between time $t_0$ and time $t_4$. The clock bit 250 corresponding to that data bit occurs from time $t_0$ to $t_1$, and the data bit 252 (always a one) occurs from time $t_2$ to $t_4$. In the period after the clock bit and before the data bit the voltage always drops to zero generating a distinct trailing edge from the clock bit. The trailing edge of the clock bit 250 will trigger flip-flop 188 producing timed pulse 254 (FIG. 5b) whose trailing edge will strobe 194 and 196 to read in the subsequent data bit at about time $t_3$, right in the middle of that data bit.

Bit 1 (the second bit of the address field and the first significant bit of the address) begins at time $t_4$. It has a preceding clock bit 256 from $t_4$ to $t_5$, which because the preceding data bit is a one appears as a continuation of that bit. However, it is the trailing edge of each clock bit that produces the timed pulses from 188 shown in FIG. 5b, and the trailing edge will always be distinct. At time $t_6$ the pulse 258 reads in data pulse 260 (another one).

Bit two (the third bit of the field) includes clock bit 262 whose trailing edge starts pulse 264. The trailing edge of pulse 264 reads in the data bit (a zero) at time $t_7$. All the remaining bits are read in the same manner with the clock bit generating a pulse in flip-flop 188 (shown in FIG. 5b) whose trailing edge occurs in the middle of the data bit. Not shown are bits 4-7 of the sensor address field and bits 13-15 of the bus address field.

The three data bits following SW(H) correspond to the three data buses. In the bus address field, bus A has been selected because data bit 266 is on and buses B and C are not selected because their corresponding data bits are off.

The complete address signal shown in FIG. 5a comprises the Compare On bit (always a one), a seven bit binary sensor address, (the first three bits of which are shown as 1, 0 and 0, and the last four bits of which are not shown), SW(H) (always a one), three bits for the bus address (shown as 1,0, and 0 indicating the A data bus is to be used), and four unused bits (but which could be used for additional data buses).

The entire transmission of the 16 bit address signal occurs during the time period set by timer 100 in the bus interface. After this time period, timer 100 will time out, and switch 94 will close, connecting the sensor power to data bus A. Data will then begin to arrive on the data bus as shown. It will be restricted in voltage between the minimum data voltage and +SPV as previously described.

Referring back to FIG. 4, the COMPARE (H) line on 212 prevents input into the serial to parallel converter 196 until a matching address has been recognized by address comparator 194. The serial to parallel converter acts as a bus select means. Once the input is opened by a digital high on COMPARE (H), the bus address is switched into 196 and steps down the eight parallel outputs QA through QH. Using as an example the bus address from FIG. 5, once the bus address has fully entered the eight bit converter 196, SW (H) (which is always high) will be at output QH and the bit corresponding to data bus A be at output QG. The bit corresponding to data bus B will be at output QF, and the bit corresponding to bus C will be at output QE.

SW (H) is also connected to line 214 at the bus AND gates 222, 224 and 226. This prevents the bus select switches 216, 218 and 220 from operating until the complete bus select address has been entered into the converter 196. Before the bus select address has entered, all of the outputs QA-QH will be low. Because the first bit in the bus address portion, SW (H) is always a one, the line 214 will switch high when the bus select address has fully entered the converter 196. When line 214 goes high, the AND gates 222, 224 and 226 will permit the appropriate bus select line 228, 230, 232 to trigger the corresponding bus select switch 21 6, 218 and 220 to connect the sensor 234 to the specified data bus through the impedance converter shown in FIG. 6.

The sensor 234 continues to send data along the data bus until sensor power is removed by the opening of sensor power switch 94 responsive to the signal in the A OFF line 72 from the central controller.

With sensor power removed from the data bus 42, the reset circuit 236 composed of voltage comparator 238 and flip-flop 240 acts to switch the OFF line 242 low. Voltage comparator 238 senses the drop in voltage on the data bus. Whenever the data bus voltage drops below the reference voltage set by voltage divider resistors 237 and 239, flip-flop 240 is triggered, changing the not Q output, which lowers OFF line 242.

OFF line 242 triggers gate 244 and NAND gate 246 set up as an inverter. CLEAR line 248 then clears the serial to parallel converter 196, causing output line 214 to lower, and opening all of the data bus switches 220, 218 and 216. The sensor interface circuit is then in the standby state awaiting the next address signal that will turn it on and connect its sensor to a data bus.

Figure 6:
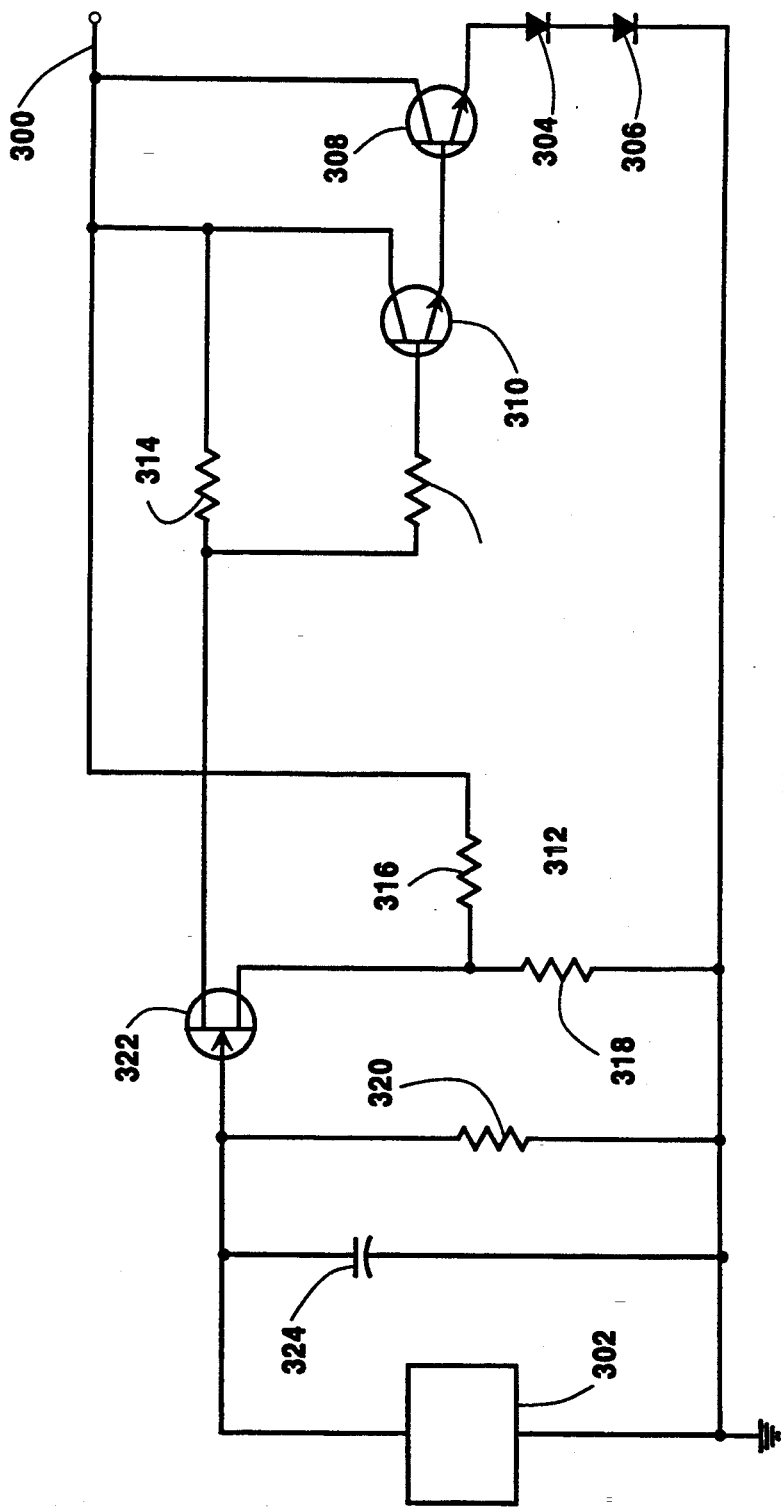
FIG. 6 is a circuit diagram of bias/impedance converter circuitry suitable for use with the accelerometers.

Sensor 234, which may be any one of a variety of different sensors, is connected to the switch selected data bus via wire 300. As an example, FIG. 6 shows a conventional piezoelectric accelerometer sensor 302 with an impedance converter and necessary adaptations for use with the present invention.

The principal change from standard impedance converter design is the use of diodes to maintain a minimum output voltage before the signal is coupled to the data bus. This minimum voltage prevents inadvertent operation of the reset circuit 236 which would cause the sensor interface to disconnect from the data bus and reset to standby mode.

Recalling that the sensor power supply is a constant current source, the biasing circuitry of sensor 234 sets up a nominal bias voltage which is 50% of the maximum sensor power voltage +SPV. The vibration signal from the piezoelectric sensor 302 is an AC signal imposed upon this DC bias voltage. The upper limit of the signal is controlled by the maximum voltage +SPV and the lower limit of the signal is controlled by diodes 304 and 306. Diodes 304 and 306 are silicon diodes, with a nominal voltage drop of 0.6 volts in each.

Figure 5:
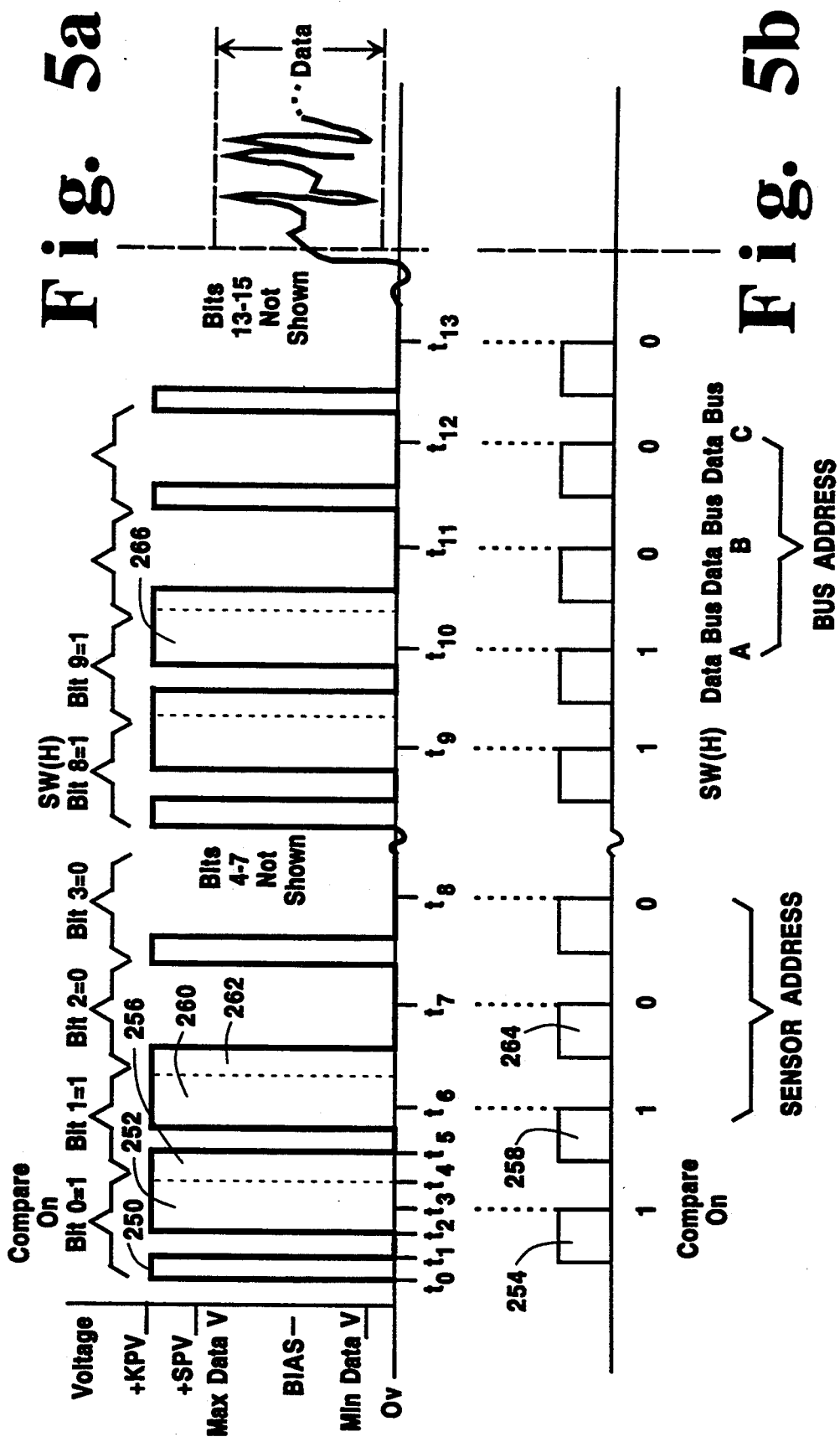
FIG. 5a is a graph of voltage versus time showing the transmission of a digital address signal on a data bus followed by receipt of analog data from the selected sensor on the same bus.
FIG. 5b is a graph of voltage versus time showing the pulses generated by address detector circuitry and used to read the self clocked data in the address signal.

Even if output transistor 308 is saturated, the output voltage on wire 300 will be no less than the voltage over these two series mounted forward biased diodes. With transistor 308 in cutoff, the output voltage will be no more than the full +SPV. At either limit, the voltage will be within a restricted range that is above the value for a digital zero in the address signal (voltage off) and below the value for a digital one (+KPV) as shown in FIG. 5.

The remainder of the impedance converter is standard. The piezoelectric sensor 302 generates an AC voltage when subjected to vibrations. The signal is amplified through FET 322 which modulates the constant current through transistors 310 and 308. Capacitor 324 and resistor 320 form the input load and bias FET 322. Resistors 318 and 316 are for additional bias and negative feedback. Resistor 314 is a load for FET 322. The output voltage on the data bus is the collector to emitter voltage on transistor 308 plus the voltage drop over diodes 304 and 308.

Other sensor circuits, as necessary for other types of sensors, would also be suitable provided that they restrict the voltage range between +SPV and a minimum which is sufficiently above the ground voltage to avoid triggering reset circuit 236.

It will thus be seen that the objects set forth above, among those made apparent from the preceding description, are efficiently attained and, since certain changes may be made in the above construction(s) without departing from the spirit and scope of the invention, it is intended that all matter contained in the above description or shown in the accompanying drawing(s) shall be interpreted as illustrative and not in a limiting sense.

Thus, having described the invention, what is claimed is:

1. A multipoint data collection system comprising:
a plurality of parallel data buses organized into a single cable, each data bus being adapted to carry data independently of each other data bus;
a central controller including a plurality of bus interface means each being connected to a corresponding one of the data buses, the central controller being adapted to send an address signal to a plurality of sensor interfaces, the address signal including a sensor address identifying a selected sensor interface and a bus address identifying a selected one of the parallel data buses from among the plurality of parallel data buses; and
the plurality of sensor interfaces, each being connected to more than one of the parallel data buses in the cable and to a corresponding sensor and each having a unique sensor address, each sensor interface including address means responsive to the address signal for connecting the corresponding sensor to the selected one of the parallel data buses specified in the bus address of the address signal when the unique sensor address of the corresponding sensor matches the sensor address specified in the address signal to send data from the corresponding sensor to the central controller over the selected one of the parallel data buses.

2. A multipoint data collection system according to claim 1 wherein the cable further includes a keep-alive power bus, each of the sensor interfaces being powered by the keep-alive power bus.

3. A multipoint data collection system according to claim 1 wherein the central controller further includes sensor power means for applying sensor power to the selected sensor interface over the selected one of the parallel data buses.

4. A multipoint data collection system according to claim 3 wherein the sensor power means provides sensor power to generate analog data within a restricted voltage range, and the address signal is a digital signal having voltages corresponding to ones and zeros that are outside of the restricted voltage range.

5. A multipoint data collection system according to claim 4 wherein the selected sensor interface includes an address detector that detects addresses by detecting voltages outside of the restricted voltage range.

6. A multipoint data collection system according to claim 3 wherein the central controller further includes a timer means for signaling the sensor power means to apply sensor power to the selected data bus after the address signal identifying the selected sensor interface and the selected one of the parallel data buses has been sent.

7. A multipoint data collection system according to claim 1 wherein the central controller further includes an input means for selecting a desired sensor.

8. A multipoint data collection system according to claim 1 wherein the central controller further includes a status output means for signaling a status of operation of the central controller.

9. A multipoint data collection system according to claim 1 wherein the central controller further includes a plurality of data output means, each data output means being connected to a corresponding one of the parallel data buses.

10. A multipoint data collection system according to claim 1 wherein each sensor interface further includes reset circuit means for disconnecting the sensor from the selected data bus.

11. A multipoint data collection system according to claim 10 wherein the central controller further includes sensor power means for applying and removing sensor power to and from the selected sensor interface over the selected one of the parallel data buses, and the sensor interface means for disconnecting the sensor from the selected one of the parallel data buses operates in response to a removal of sensor power from the selected one of the parallel data buses.

12. A multipoint data collection system according to claim 11 wherein the sensor power means comprises a constant current source which powers the sensor corresponding to the selected sensor interface to send analog data on the selected one of the parallel data buses.

13. A multipoint data collection system according to claim 12 wherein the address signal is a binary digital signal having a higher voltage and a lower voltage, one of said voltages corresponding to a binary one and the other of said voltages corresponding to a binary zero, the higher voltage being greater than the maximum voltage available from the sensor power means.

14. A multipoint data collection system according to claim 1 wherein the address signal is a digital signal composed of data bits and clock bits, each bit of the address signal being preceded by a clock bit.

15. A multipoint data collection system according to claim 1 wherein the address signal is composed of a sensor address and a bus address.

16. A multipoint data collection system according to claim 1 wherein a plurality of sensor interfaces are organized into a multiple sensor distribution box, the plurality of sensor interfaces being connected to the parallel data buses through a common connector and a plurality of sensors being connected to the sensor interfaces in the multiple sensor distribution box.

17. A multipoint data collection system according to claim 1 further including a sensor power means remotely located from the central controller.

18. A multipoint data collection system according to claim 1 wherein each bus interface means includes an auxiliary connection for making a DC connection to the selected one of the parallel data buses connected to the bus interface.

19. A multipoint data collection system according to claim 1 wherein at least one sensor interface is located within a housing also enclosing a sensor.

20. A multipoint data collection system comprising:
 a plurality of data buses organized into a cable, each data bus having a corresponding bus address and each data bus being adapted to carry data independently of each other data bus;
 a central controller including:
  an input means for selecting a sensor from which data is to be collected,
  a microcontroller responsive to the input means for generating an address signal including a sensor address corresponding to the selected sensor and a bus address specifying a selected data bus over which the data should be transmitted,
  a data output means for outputting data received from the selected sensor, and
  a plurality of bus interfaces corresponding to the plurality of data buses, each bus interface being connected to the corresponding data bus and to the microcontroller and including:
   address means for placing the address signal onto the corresponding data bus connected to the bus interface,
   sensor power means for applying sensor power to the corresponding data bus connected to the bus interface; and
 a plurality of sensor interfaces adapted for connection at spaced locations along the cable, each sensor interface being connected to the plurality of data buses and to a corresponding sensor, each sensor interface comprising: means for storing a unique sensor address,
  an address detector connected to the plurality of data buses,
  an address comparator, responsive to the address detector, producing a bus select output signal corresponding to the bus address upon receipt of a sensor address from the address detector that matches the unique identifying sensor address,
  a bus select means, responsive to the bus select output signal of the address comparator, for connecting the sensor to the selected one of the data buses specified in the bus address, and
  reset means for disconnecting the sensor from the selected data bus.

21. A multipoint data collection system according to claim 20 wherein the reset means for disconnecting the sensor from the selected one of the parallel data buses disconnects the sensor whenever the voltage on the address bus drops to a value below a predetermined reference voltage.

22. A multipoint data collection system according to claim 20 wherein a plurality of sensor interfaces are organized into a multiple sensor distribution box, the plurality of sensor interfaces being connected to the data buses through a common connector and a plurality of sensors being connected to the plurality of sensor interfaces in the multiple sensor distribution box.

23. A multipoint data collection system according to claim 20 wherein the sensor power means provides sensor power to generate analog data within a restricted voltage range, and the address signal is a digital signal having voltages corresponding to ones and zeros that are outside of the restricted voltage range.

24. A multipoint data collection system according to claim 23 wherein the address detector detects addresses by detecting voltages outside of the restricted voltage range.

25. A multipoint data collection system comprising:
   at least one data bus having a plurality of connection points at spaced locations along the length of the at least one data bus;
   a central controller including a bus interface means connected to the at least one data bus for sending a digital address signal on the at least one data bus identifying a selected sensor interface;
   a plurality of sensors producing analog sensor data; and
   a plurality of sensor interfaces, corresponding to the plurality of sensors, adapted for connection to a at least one data bus and to the corresponding sensor and each including:
      means for storing a unique address,
      address means responsive to the digital address signal to produce a match signal when the unique address is included in the digital address signal,
      switch means closing in response to the match signal to connect the corresponding sensor to the at least one data bus to send analog sensor data to the central controller over the at least one data bus, and
      reset means for opening the switch means to disconnect the corresponding sensor from the at least one data bus.

26. A multipoint data collection system according to claim 25 wherein the reset means includes a voltage comparator responsive to a drop in voltage on the at least one data bus below a reference voltage to open the switch means and disconnect the corresponding sensor from the at least one data bus.

27. A multipoint data collection system according to claim 26 wherein the corresponding sensor produces analog data having a voltage which is greater than the reference voltage in the reset means.

* * * * *

UNITED STATES PATENT AND TRADEMARK OFFICE
CERTIFICATE OF CORRECTION

PATENT NO. : 5,430,663

DATED : July 4, 1995

INVENTOR(S) : Judd et al.

It is certified that error appears in the above-identified patent and that said Letters Patent is hereby corrected as shown below:

In column 2, line 42: "pad" should read - -part- -.

In column 6, line 18: "fell" should read - -tell- -.

In column 7, line 45: before "SPV", please insert - -+- -.

In column 8, line 6: after "bus", please delete - -.- -.

In column 11, line 64: after ")", please insert a space.

In column 13, line 28: "21 6" should read - -216- -.

Signed and Sealed this

Tenth Day of October, 1995

Attest:

*Attesting Officer*

BRUCE LEHMAN

*Commissioner of Patents and Trademarks*